April 8, 1930.   J. W. BAILLIE   1,753,588
NONSKID BRAKE
Filed Nov. 5, 1928
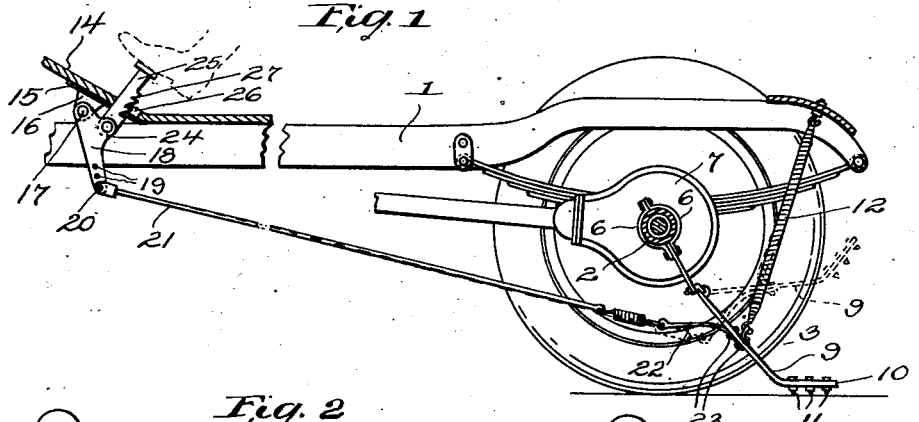
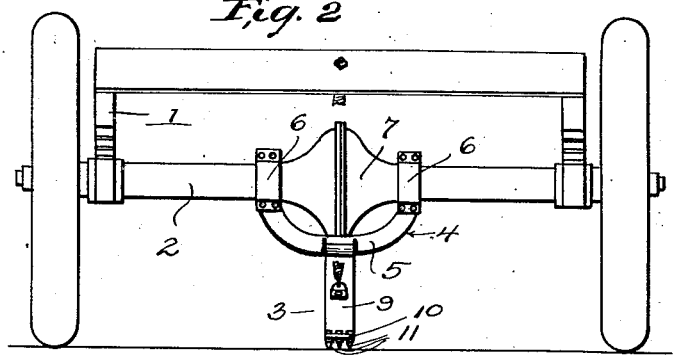
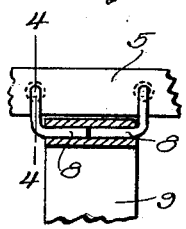
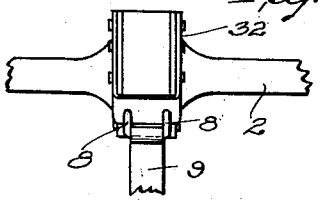
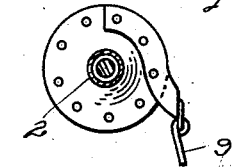
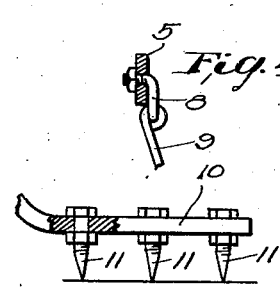
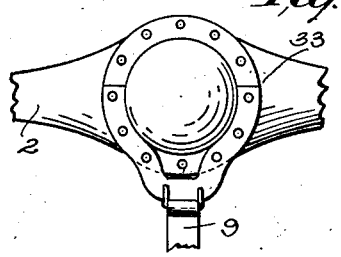
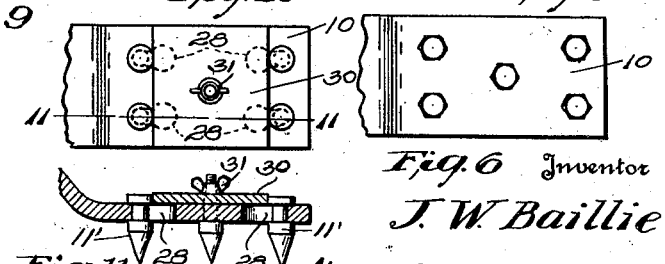
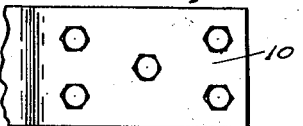
Inventor
J. W. Baillie
By W. S. McDowell
Attorney Patented Apr. 8, 1930

1,753,588

UNITED STATES PATENT OFFICE

JESSE W. BAILLIE, OF NEWARK, OHIO

NONSKID BRAKE

Application filed November 5, 1928. Serial No. 317,205.

This invention relates to improvements in vehicle brakes, and has for its object the provision of a brake of the drag type which is normally maintained out of engagement with the ground or road surface, but which upon the operation of a simple manual control may be brought into engagement with the ground for the purpose of effectively arresting the speed of the vehicle and particularly for the purpose of overcoming uncontrolled lateral movement or skidding of the vehicle or other unusual movements beyond the control of the customary brakes provided upon the vehicle.

With these and other objects in view, as will appear as the description proceeds, the invention consists in the novel features of construction, combinations of elements and arrangements of parts hereinafter to be more fully described and pointed out in the appended claims.

In the accompanying drawing:

Figure 1 is a vertical sectional view taken through the chassis of the motor vehicle provided with my improved non-skid brake comprising the present invention, the brake being disclosed in its active or lowered position, Figure 2 is a rear elevation thereof, Figure 3 is a detailed sectional view taken through the upper end of the brake member, Figure 4 is a similar view taken on the line 4—4 of Figure 3, Figure 5 is a detailed view of the lower end of the brake member partly broken away to show detachably connected projections thereof, Figure 6 is a top plan view thereof, Figure 7 is a view showing the brake member connected to the differential housing of the rear axle of a different design, Figure 8 is an end elevation thereof, Figure 9 is a view showing the brake member mounted on the differential housing of the so-called "banjo" type of a rear axle, Figure 10 is a top plan view of the brake member showing a modified form of connection between the brake member and the ground engaging projections, and Figure 11 is a vertical sectional view taken on the line 11—11 of Figure 10.

Referring more particularly to the drawings, the numeral 1 designates the chassis or frame of a motor vehicle, the numeral 2 the rear axle housing thereof and the numeral 3 designates generally the improved non-skid brake comprising the present invention.

The brake comprises an anchoring member 4 which may be shaped to conform with the rear axle housings or casings of various types and designs, and is disclosed in Figures 1 and 2, shaped to include a substantially U shaped strap 5 having its upper ends connected with separable clamping pieces 6 which surround the rear axle housing 2 and are disposed on opposite sides of the differential casing 7. The strap 5 is rigidly held and securely clamped to the axle housing and has its lower end formed with openings for the reception of a pair of hook shaped pintles 8. Hingedly connected to the pintles 8 is a movable ground engaging member or shoe 9, which has its lower end terminating in an angularly bent foot 10, which when the brake member is lowered lies substantially horizontal with the road or ground surface. This foot may have connected thereto jointed projections 11 for the purpose of enabling the brake device to obtain a secure grip upon the road surface and especially so in the event such road surface is covered with ice or snow. The projections 11 may also be detachably connected to the foot 10 so that they may be replaced when worn. A spring 12 is connected with the member 9 at its lower end and has its upper end fastened to the under side of the cross member 13 of the chassis, the normal function of the spring 12 being to maintain the brake member in its elevated or inactive position to effect convenient control of the brake member from the driver's position of the vehicle. The foot board 14 of said vehicle is formed to include a slot adjacent to which is located a plate 15. The under side of this plate is provided with a pair of projecting ears 16 to which are pivoted, as at 17, an operating lever 18. This lever extends downwardly and is provided with a plurality of openings 18 to any one of which there is fastened, as at 20, the forward end of a rod or cable 21. The opposite extremity of the rod or cable 21 is connected with an arm 22 which is rigidly secured, as at 23, to the movable brake member 9, in order that oscillation of the lever 18 will impart corresponding movement on the part of said brake member.

To operate the lever 18 the latter is provided with a branch 24 to which is connected the lower end of a foot pedal 25. This pedal extends to a slot 26 provided in the plate 15 and has the shank thereof provided along one of its faces with ratch teeth 27. These teeth are normally maintained by gravity in contact with the lower edge or wall of the slot 26 so that when the pedal is manually depressed to swing the auxiliary brake member to its active or road engaging position, the teeth 27 will rockingly engage the adjacent edge portion of the plate 15 to retain the brake member in its active position, without need of sustained foot pressure. The lever 18 is provided with a plurality of openings 19 for the purpose of adjusting the pull of the auxiliary brake member and to adapt the latter to vehicles having wheels of varying diameter and also to compensate for varying lengths of cable or rod 21. To release the brake member from its lowered or applied position the pedals are pushed forwardly to disengage the teeth 27 from the lower edge of the slot provided in the plate 15. This enables the brake member to restrain the influence of the spring 12, which restores the same to an elevated or inactive position.

In the modified form disclosed in Figures 10 and 11, the foot 10 of the brake member is provided with keyhole slots 28, in which are positioned the pointed projections 11'. The projections 11' are recessed, so as to fit into the narrow portion of the keyhole slots, and are held therein by means of a keeper plate 30. The plate 30 is held in place upon the foot 10 by the wing nut 31 of the threaded central projection 11'. The purpose of the plate is to hold the projections firmly in place on the brake member and to also permit of their easy removal therefrom for replacement without the necessity of employing threaded connections or other cumbersome fastenings for holding the projections in place upon the brake member.

In view of the foregoing it will be seen that I have provided a simple yet effective auxiliary brake particularly adapted for motor vehicles and which when in use will serve to overcome side skidding of the vehicle and which may also be used in the capacity of an emergency brake, operating in conjunction with the ordinary brake (not shown) of the vehicle for arresting uncontrolled movements thereof. By pivoting the brake member upon the anchoring member, the latter may be shaped and adapted to motor vehicles or rear axle housings which includes differential casings of different designs such as indicated at 32 and 33 of Figures 7, 8 and 9. The device has the advantage of being extremely simple to install and may be applied to any standard type of motor vehicle.

What is claimed is:

1. In a motor vehicle, the combination with the rear axle housing, of a brake member pivotally associated with said axle housing, means for holding said member normally off the ground, said brake member including a foot disposed at an angle to the main portion of the brake member, and provided with keyhole slots for the reception of pointed projections, and a plate connected with said foot and serving to keep said projections within said slots.

2. In a motor vehicle, the combination with the rear axle housing thereof of a brake device pivotally connected at a point below said housing and in the center between the driving wheels of said vehicle, means for holding said device normally off the ground, means for depressing said device including a foot having keyhole slots formed therein, grooved ground engaging projections positioned within said slots, and a keeper plate serving to cover the enlarged portions of said slots thus preventing the projections from becoming disengaged from said foot portion.

3. In a motor vehicle, the combination with the rear axle housing thereof, of a brake member pivotally associated with axle housing, means for holding said member normally off the ground, means for depressing said member into engagement with the roadway, said member including a foot disposed at an angle with respect to the main portion of said member and provided with a plurality of keyhole slots, a headed ground engaging projections positioned within said slots, and a keeper plate disposed between said projections and serving to keep the latter within the narrow portions of said slot.

In testimony whereof I affix my signature.

JESSE W. BAILLIE.